US007876697B2

(12) United States Patent
Thompson et al.

(10) Patent No.: US 7,876,697 B2
(45) Date of Patent: Jan. 25, 2011

(54) METHOD AND APPARATUS FOR CHARACTERIZING MODULATION SCHEMES IN AN HFC NETWORK

(75) Inventors: Robert J. Thompson, Horsham, PA (US); Michael J. Cooper, Marietta, GA (US); Charles S. Moore, Langhorne, PA (US); John L. Moran, III, Uxbridge, MA (US)

(73) Assignee: General Instrument Corporation, Horsham, PA (US)

( * ) Notice: Subject to any disclaimer, the term of this patent is extended or adjusted under 35 U.S.C. 154(b) by 546 days.

(21) Appl. No.: 11/613,823

(22) Filed: Dec. 20, 2006

(65) Prior Publication Data

US 2008/0101210 A1     May 1, 2008

Related U.S. Application Data

(60) Provisional application No. 60/863,068, filed on Oct. 26, 2006.

(51) Int. Cl.
    *H04L 12/26*     (2006.01)
(52) U.S. Cl. ....................................... 370/252
(58) Field of Classification Search ................. 370/252
    See application file for complete search history.

(56) References Cited

U.S. PATENT DOCUMENTS

| 5,251,324 | A | 10/1993 | McMullan |
| 5,271,060 | A | 12/1993 | Moran, III et al. |
| 5,347,539 | A | 9/1994 | Sridhar et al. |
| 5,463,661 | A | 10/1995 | Moran, III et al. |
| 5,606,725 | A * | 2/1997 | Hart ........................... 725/131 |
| 5,631,846 | A | 5/1997 | Szurkowski |
| 5,732,104 | A | 3/1998 | Brown et al. |
| 5,870,429 | A | 2/1999 | Moran, III et al. |
| 5,939,887 | A | 8/1999 | Schmidt et al. |
| 5,943,604 | A | 8/1999 | Chen et al. |
| 6,032,019 | A | 2/2000 | Chen et al. |
| 6,272,150 | B1 | 8/2001 | Hrastar et al. |
| 6,278,730 | B1 | 8/2001 | Tsui et al. |
| 6,321,384 | B1 | 11/2001 | Eldering |

(Continued)

OTHER PUBLICATIONS

Newton's Telecom Dicitionary, Sep. 1995, Flatiron Publishing, 9th Edition, pp. 216 and 1023, definitions of "carrier to noise ratio" and "signal to noise ratio".*

(Continued)

*Primary Examiner*—Melvin Marcelo
(74) *Attorney, Agent, or Firm*—Larry T. Cullen

(57) ABSTRACT

The available modulation schemes of a network are analyzed to determine which ones contain excessive phase noise or narrowband interference. A network element is selected and assigned to a test channel at a first modulation scheme at a predetermined power level to achieve a predetermined PER. The network element transmits a test signal and the network controller measures the signal to noise ratio (SNR) in the received test signal. If the SNR is not within a predetermined tolerance range of an estimated SNR for the modulation scheme at the predetermined PER, the modulation scheme is determined to have excessive phase noise or narrowband interference. Each available modulation scheme is tested by instructing the network element to transmit the test signal using each modulation scheme and assigning the power level of each modulation scheme. The suitable modulation schemes may be determined.

20 Claims, 4 Drawing Sheets

U.S. PATENT DOCUMENTS

| | | |
|---|---|---|
| 6,334,219 B1 | 12/2001 | Hill et al. |
| 6,377,552 B1 | 4/2002 | Moran, III et al. |
| 6,389,068 B1 | 5/2002 | Smith et al. |
| 6,434,583 B1 | 8/2002 | Dapper et al. |
| 6,483,033 B1 | 11/2002 | Simoes et al. |
| 6,559,756 B2 | 5/2003 | Al-Araji |
| 6,570,913 B1 | 5/2003 | Chen |
| 6,606,351 B1 | 8/2003 | Dapper |
| 6,611,795 B2 | 8/2003 | Cooper |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,816,463 B2 | 11/2004 | Cooper et al. |
| 6,895,594 B1 | 5/2005 | Simoes et al. |
| 6,906,526 B1 | 6/2005 | Hart, Jr. et al. |
| 6,961,370 B2 | 11/2005 | Chappell |
| 6,985,437 B1 | 1/2006 | Vogel |
| 7,246,368 B1 * | 7/2007 | Millet et al. ................ 725/111 |
| 7,616,654 B2 | 11/2009 | Moran, III et al. |
| 7,672,310 B2 | 3/2010 | Cooper et al. |
| 7,742,697 B2 | 6/2010 | Cooper et al. |
| 2001/0055319 A1 | 12/2001 | Quigley et al. |
| 2002/0168131 A1 | 11/2002 | Walter et al. |
| 2003/0028898 A1 | 2/2003 | Howald |
| 2003/0138250 A1 | 7/2003 | Glynn |
| 2003/0149991 A1 | 8/2003 | Reidhead et al. |
| 2003/0179768 A1 | 9/2003 | Lusky et al. |
| 2003/0179770 A1 | 9/2003 | Reznik et al. |
| 2003/0179821 A1 | 9/2003 | Lusky et al. |
| 2003/0181185 A1 | 9/2003 | Lusky et al. |
| 2003/0185176 A1 | 10/2003 | Lusky et al. |
| 2004/0015765 A1 | 1/2004 | Cooper et al. |
| 2004/0073937 A1 | 4/2004 | Williams |
| 2004/0109661 A1 | 6/2004 | Bierman et al. |
| 2005/0025145 A1 | 2/2005 | Rakib et al. |
| 2005/0039103 A1 | 2/2005 | Azenko et al. |
| 2005/0058082 A1 | 3/2005 | Moran et al. |
| 2005/0122996 A1 | 6/2005 | Azenkot et al. |
| 2005/0183130 A1 | 8/2005 | Sadja et al. |
| 2005/0198688 A1 | 9/2005 | Fong |
| 2005/0226161 A1 | 10/2005 | Jaworski |
| 2008/0200129 A1 * | 8/2008 | Cooper et al. ............ 455/67.14 |

OTHER PUBLICATIONS

Office Action, Korean App. No. 10-2007-107827 (Foreign Text), Jun. 29, 2009.

Office Action, Korean App. No. 10-2007-107827 (English Text), Jul. 20, 2009.

European Search Report for EP 07017516, dated Feb. 20, 2008.

PCT International Search Report and Written Opinion for PCT/US07/62417 - Dated Dec. 21, 2007.

* cited by examiner

METHOD AND APPARATUS FOR CHARACTERIZING MODULATION SCHEMES IN AN HFC NETWORK

This application claims the benefit of U.S. Provisional Application No. 60/863,068 filed on Oct. 26, 2006 titled Method To Diagnose Phase Noise And/Or Narrowband Interference Limitations Within An Upstream Hfc Plant, herein incorporated by reference in its entirety.

FIELD OF THE INVENTION

This disclosure is directed toward characterizing modulation schemes in a HFC network. More particularly, this disclosure is directed toward an automated approach to analyze available modulation schemes for phase noise and narrowband interference in a HFC network.

BACKGROUND OF THE INVENTION

Hybrid fiber coaxial (HFC) cable television systems have been in widespread use for many years and extensive networks have been developed. A typical HFC network generally contains a headend which provide communications between user in the HFC network and the IP/PSTN networks. The headend usually contains a cable modem termination system (CMTS) containing several receivers, each receiver handling communications between hundreds of end user network elements. The headend is generally connected to several nodes and each node is connected to many network elements, such as data over cable system (DOCSIS) terminal network elements (e.g. media terminal adapters (MTA) or cable modems), e.g., a single node may be connected to hundreds of modems. In many instances several nodes may serve a particular area of a town or city.

A typical HFC network uses optical fiber for communications between the headend and the nodes, and uses coaxial cable for communications between the nodes and the end users. Downstream optical communications over the optical fiber are typically converted at the nodes to RF communications for transmission over the coaxial cable. Conversely, upstream (or return path) RF communications from the users are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. More particularly, the optical components contribute to the quality of signals received by the CMTS from the users, and may cause distortion of the signals or otherwise degrade their quality.

The RF signals are generally in the form of modulated RF signals. Several modulation schemes exist with different levels of complexity. However, phase noise or narrow band interference may prevent a HFC network from effectively using some of the modulation schemes. Particularly, phase noise and/or narrowband interference will often limit the level of modulation complexity that may be transmitted over an upstream HFC plant. Phase noise is generated through the modulation and demodulation processes between the DOCSIS terminal devices (MTA or cable modems) and the CMTS. This noise generally combines with and potentially degrades the noise already present within the upstream HFC plant. Distortion is typically generated by nonlinear active components in the return path. Distortion may produce appreciable narrowband spurious signals, which could interfere with frequencies used by the CMTS and DOCSIS terminal devices.

Accurately diagnosing phase noise and/or narrowband interference issues requires a technician or engineer to be at multiple locations within the HFC plant simultaneously to inject test signals at the suspected DOCSIS terminal device locations and assess performance at the headend location with specialized test equipment, such as a vector signal analyzer. The problem with this diagnostic process is that it is manual, time consuming and costly.

SUMMARY OF THE INVENTION

This disclosure explains an automated process to determine whether impairments, such as phase noise and/or narrowband interference are appreciably degrading the upstream plant performance in conjunction with measurements made at the headend via a CMTS device, which does not require rolling trucks to remote locations within a HFC plant. Additionally, this process determines the highest modulation complexity that may be supported with respect to the upstream HFC plant performance.

In accordance with the principles of the invention, an apparatus for characterizing modulation schemes for a network may comprise: a controller configured to instruct a network element to transmit a test signal at a test frequency at a first modulation scheme and a first power; a receiver configured to receive the test signal from the network element; and an equalizer which measures a signal to noise ratio of the test signal, wherein the controller determines if the signal to noise ratio is within a predetermined range of an estimated signal to noise ratio, and the controller determines that the modulation scheme has excessive inband interference or phase noise when the signal to noise ratio is not within a predetermined range of an estimated signal to noise ratio.

The controller may instruct the network element to repeatedly transmit the test signal at other modulation schemes available, and to determine which modulation schemes provide a signal to noise ratio is within a predetermined range of an estimated signal to noise ratio. The controller may also instruct the network element to adjust the transmission power of the test signal to correspond with a predetermined packet error rate for each of the other modulation schemes. The controller may create a list of optimum modulation schemes for the network to use.

In accordance with the principles of the invention a method for characterizing modulation schemes for a network may comprise the steps of: selecting a network element to transmit a test signal at a test frequency at a first modulation scheme and a first power; receiving the test signal from the network element; measuring a signal to noise ratio of the test signal; determining if the signal to noise ratio is within a predetermined range of an estimated signal to noise ratio, and determining that the modulation scheme has excessive inband interference or phase noise when the signal to noise ratio is not within a predetermined range of an estimated signal to noise ratio.

In accordance with the principles of the invention, a computer readable medium may carry instructions for a computer to perform a method for characterizing modulation schemes for a network comprising the steps of: selecting a network element to transmit a test signal at a test frequency at a first modulation scheme and a first power; receiving the test signal from the network element; measuring a signal to noise ratio of the test signal; determining if the signal to noise ratio is within a predetermined range of an estimated signal to noise ratio, and determining that the modulation scheme has excessive inband interference or phase noise when the signal to noise ratio is not within a predetermined range of an estimated signal to noise ratio.

The invention enables the technician or engineer to remotely characterize the modulation schemes which are available to a network without significant phase noise or narrowband interference at a central location, such as the headend, such as by using the Motorola BSR64000, rather than using external test equipment, such as the vector signal analyzer and deploying technicians to various locations within the cable plant. The invention also avoids impacting active services. It also allows the cable operator to plan for future offerings and schedule needed maintenance by allowing periodic monitoring of the phase noise and narrowband interference. All measurements may be made through the use of the existing terminal devices (specifically, DOCSIS terminal devices such as MTAs and cable modems) as well as headend equipment (specifically a DOCSIS CMTS).

Accurate knowledge of the available or optimum modulation schemes of a network will enable an operator to utilize the available resources of their network more efficiently, such as by adding additional network elements to improve portions of the network with the least complex modulation schemes so that those portions may be able to use more complex modulation schemes. An operator may also use the invention to identify and repair a network component introducing phase noise or narrowband interference to improve signal quality and network speed.

BRIEF DESCRIPTION OF THE DRAWINGS

The following drawings serve to illustrate the principles of the invention.

DETAILED DESCRIPTION OF THE INVENTION

This disclosure explains an automated process to determine whether impairments, such as phase noise and/or narrowband interference are appreciably degrading the upstream plant performance in conjunction with measurements made at the headend via a CMTS device. Additionally, this process determines the highest modulation complexity that may be supported with respect to the upstream HFC plant performance. This process preferably uses only DOCSIS terminal devices in conjunction with measurements made at the headend via a DOCSIS CMTS device, and does not require rolling trucks to remote locations within a plant or specialized test equipment.

Adequate margin should preferably be available in the network to allow the addition of 2 DOCSIS channels. A methodology for determining the available power margin in a network is described in commonly assigned disclosure, entitled METHOD AND APPARATUS FOR DETERMINING THE TOTAL POWER MARGIN AVAILABLE FOR AN HFC NETWORK filed on Oct. 20, 2006 and assigned U.S. Ser. No. 11/551,014, herein incorporated by reference in its entirety.

Preferably, an active Return Path is providing services at the time that the operator desires to associate (group) network elements according to common optical nodes. Also, this test picks test frequency locations based upon avoiding interference of $2^{nd}$ order intermods on active data services. We are assuming adequate margin is available such that $3^{rd}$ order products are not a problem for the active services.

Figure 1:
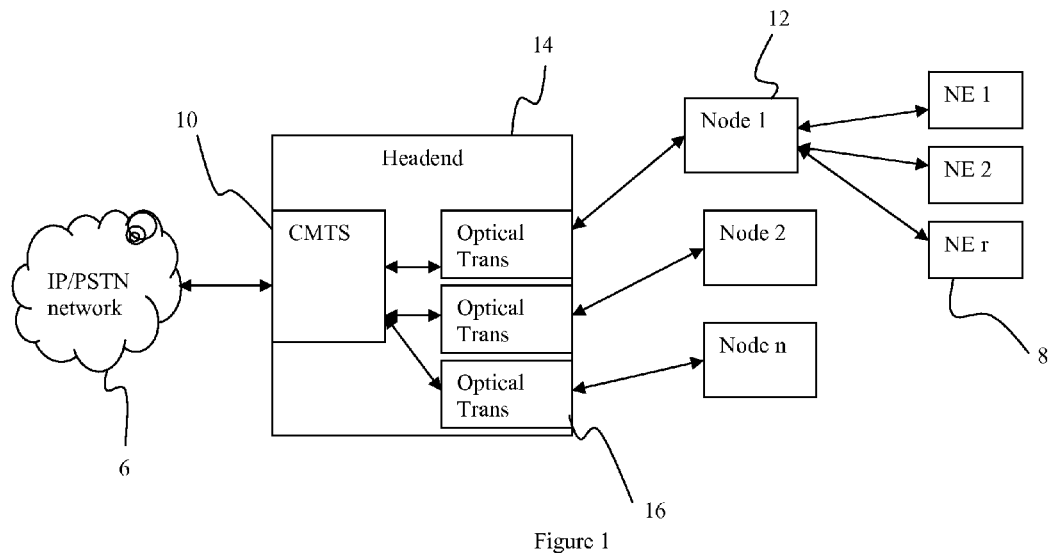
FIG. 1 illustrates an exemplary network in accordance with the principles of the invention.

FIG. 1 illustrates an exemplary network in which a plurality of terminal network elements 8 (e.g. cable modems, set top boxes, televisions equipped with set top boxes, or any other element on a network such as an HFC network) are connected to a cable modem termination system (CMTS) 10 located in a headend 14 through nodes 12 and one or more taps (not shown). In an exemplary arrangement, headend 14 also contains an optical transceiver 16 which provides optical communications through an optical fiber to the plurality of nodes 12. The CMTS 10 connects to an IP or PSTN network 6. Those of skill in the art will appreciate that there may be a plurality of nodes 12 connected to a headend, and a headend may contain a plurality of CMTS units, each of which contain a plurality of receivers (e.g. 8 receivers) each of which communicate with a plurality (e.g. 100 s) of network elements 8. The CMTS 10 may also contain a spare receiver which is not continuously configured to network elements 8, but may be selectively configured to network elements 8. Use of a spare receiver is described in commonly assigned patent application Ser. No. 11/171,066, filed on Jun. 30, 2005 and titled Automated Monitoring of a Network, herein incorporated by reference in its entirety.

Figure 2:
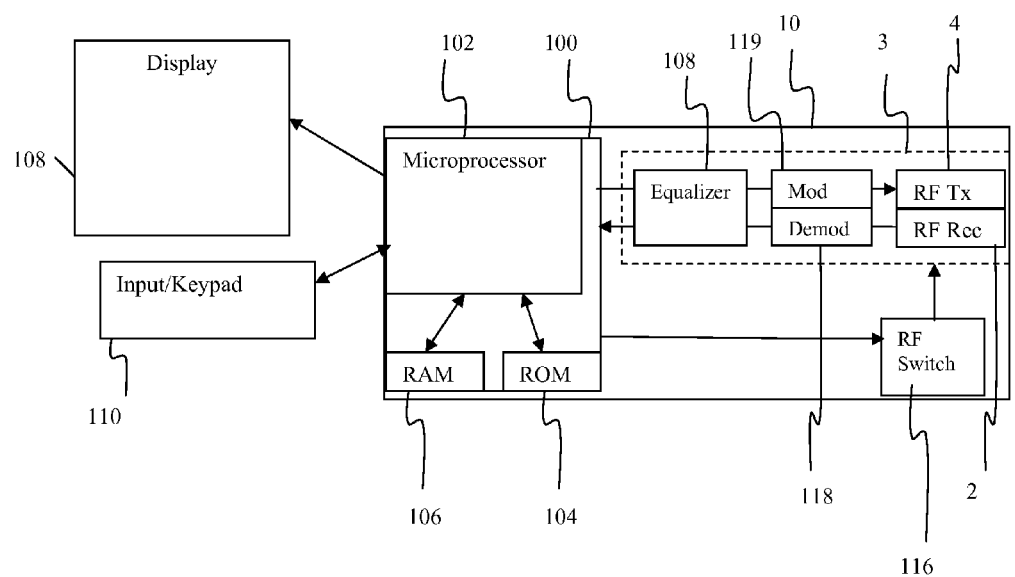
FIG. 2 illustrates an exemplary CMTS architecture in accordance with the principles of the invention.

FIG. 2 illustrates a logical architecture of an exemplary CMTS 10 to facilitate an understanding of the invention. As illustrated in FIG. 2, CMTS 10 may contain a processing unit 100 which may access a RAM 106 and a ROM 104, and may control the operation of the CMTS 10 and RF communication signals to be sent by the network elements 8 to the CMTS 10. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a station maintenance (SM) is being performed or a receiver is in need of load balancing. An input keypad 110 may also be connected to processing unit 100 and may allow an operator to provide instructions, processing requests and/or data to processor 100.

RF transceiver (transmitter/receiver) unit 3 preferably contains a plurality of transmitters 4 and receivers 2 to provide bi-directional communication with a plurality of network elements 8 through optical transceivers 16, nodes 12 and a plurality of network taps (not shown). Those of skill in the art will appreciate that CMTS 10 may contain a plurality of RF receivers 2, e.g. 8 RF receivers and a spare RF receiver. Each RF receiver 2 may support over 100 network elements. The RF receiver 2, such as a Broadcom 3140 receiver (receiver), preferably provides the received RF signals to a demodulator unit 118 and to an equalizer 108 which is used to acquire equalizer values and burst modulation error ratio (MER) measurements, packet error rate (PER) and bit error rate (BER). The equalizer is preferably a multiple tap linear equalizer (e.g. a 24 tap linear equalizer), which also may be known as a feed forward equalizer (FFE). Equalizer 108 may be integrally contained in RF receiver 2 or may be a separate device. The communication characteristics of each receiver 2 may be stored on ROM 104 or RAM 106, or may be provided from an external source, such as headend 14. RAM 104 and/or ROM 106 may also carry instructions for microprocessor 102.

RF transceiver unit 3 also includes a modulator 119 which receives downstream signals from equalizer unit 108, modulates them, and provides the modulated signals to RF transmitters 4. Preferably, the modulator 119 and demodulator 118 are capable of modulation schemes of various levels of complexity. For example, some DOCSIS 2.0 modulation schemes which may be used in order of level of complexity are: 16 QAM, 32 QAM, 64 QAM and 128 QAM. In the preferred implementation, microprocessor 102 provides instructions to the network elements as which modulation scheme is to be used during communication.

Figure 3:
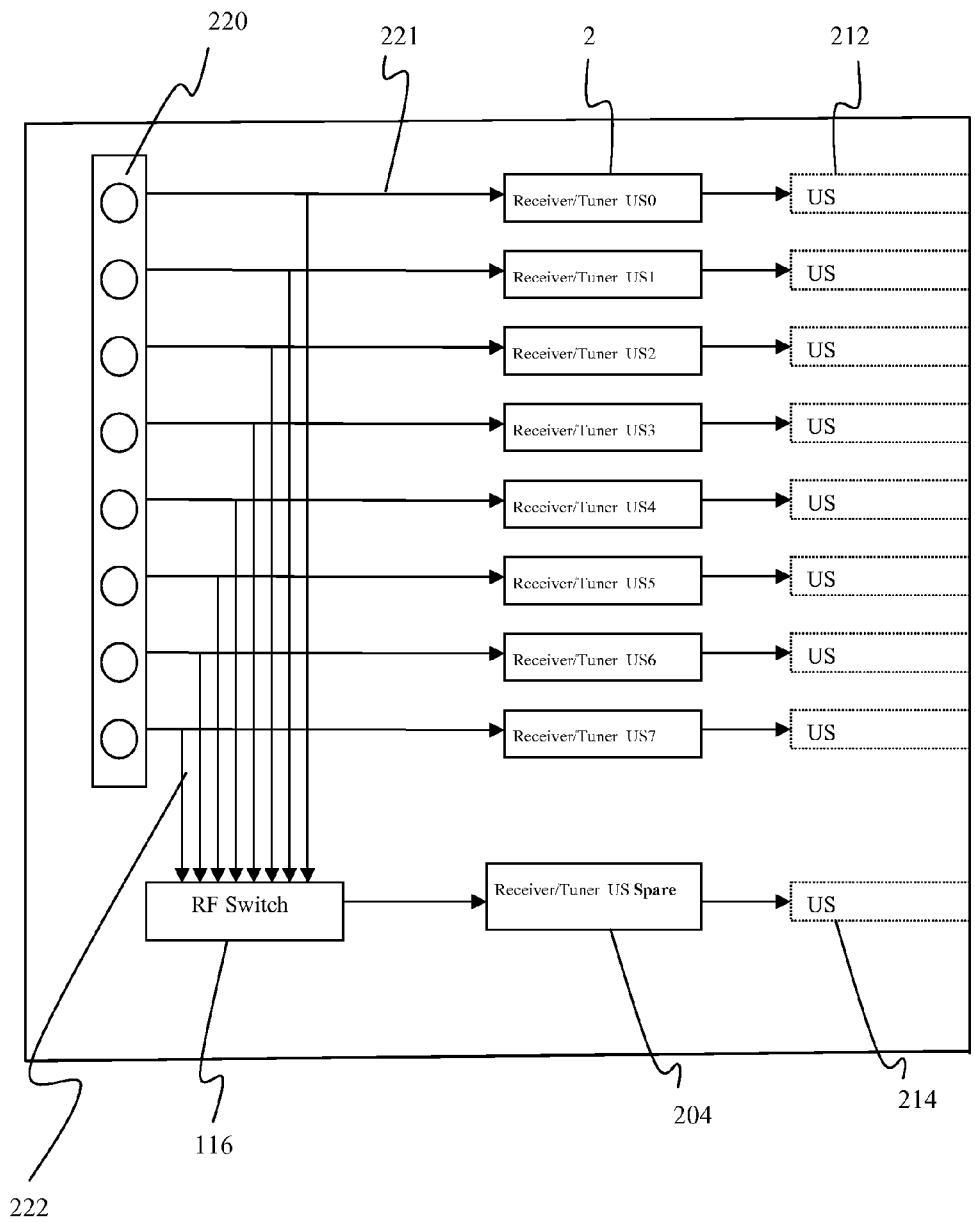
FIG. 3 illustrates an exemplary receiver arrangement which may communicate with an exemplary CMTS of the present invention.

FIG. 3 illustrates a logical arrangement of a group of receivers 201 to facilitate an understanding of the invention. As illustrated in FIG. 3 a spare receiver 204 may be tapped into each of the primary receiver ports 220 (e.g. R0-R7) in a non-intrusive manner. As illustrated, CMTS receiver ports 220, which may be in the form of Amphenol connectors, are provided to allow cables, e.g. coaxial cables, (not shown) to be connected with primary receivers 2. The receivers 2 provide data signals to CMTS 10 through ports 212, and spare receiver 204 provides data signals to CMTS 10 through port 214.

Spare receiver 204 preferably taps into signal lines 221 of primary receiver ports 220 via signal lines 222, and the taps are preferably located where the cable signal comes from receiver ports 220 into the receivers 2 so both the connected primary receiver 2 and the spare receiver 204 may receive the same signal. Those of skill in the art will appreciate that each of the primary receivers 2 (e.g. receivers R0-R7) receive signals according to different communication characteristics, e.g. communication on a different frequency (RF band) and communication protocols. Spare receiver 204 is preferably tunable to the RF bands of each of the primary receivers 2. Preferably, the spare receiver 204 connects (matrices) with only one primary receiver 2 at a time.

When a cable operator initiates a testing operation they may select any registered network element of their choice or the CMTS 10 may select the network element for them. Once the network element has been selected it is moved (tuned to the frequency) to the spare receiver testing data is passed to it and the results are measured. Once the testing measurements are completed the network element is moved back (instructed to retune to frequency of the primary receiver) to its original primary receiver. This whole process is preferably performed without deregistering the network element from the network to avoid disrupting the subscriber's service or any other services on the primary receiver to other subscribers.

Figure 4:
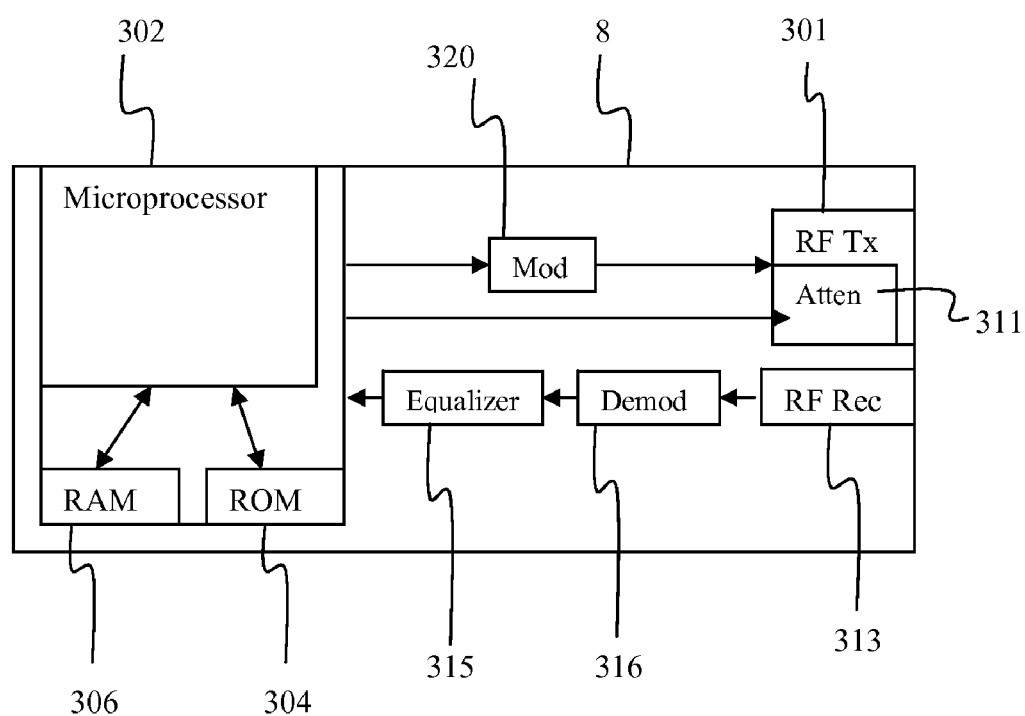
FIG. 4 illustrates an exemplary architecture of a network element which may communicate with an exemplary CMTS of the present invention.

FIG. 4 illustrates an exemplary network element 8, such as a cable modem. Network element 8 preferably contains a processor 302 which may communicate with a RAM 306 and ROM 304, and which controls the general operation of the network element, including the pre-equalization parameters and preamble lengths of communications sent by the network element in accordance with instructions from the CMTS 10. Network element 8 also contains a transceiver (which includes a transmitter and receiver) which provides bidirectional RF communication with CMTS 10. Network element 8 contains a demodulator 316 which demodulates the signals received by RF receiver 313, and may also contain an equalizer unit 315 which may equalize the communications received from CMTS 10. Network element 8 also contains a modulator 320 which modulates signals to be transmitted upstream to the CMTS according to a modulation scheme which the network element has been instructed by the CMTS to use. Network element 8 also contains an attenuator 311 which is controlled by microprocessor 302 to attenuate signals to be transmitted by RF transmitter 301 to be within a desired power level. Those of skill in the art will appreciate that the components of network element 8 have been illustrated separately only for discussion purposes and that various components may be combined in practice.

In a preferred implementation, the present invention may use a DOCSIS network element, such as a cable modem, to generate the test signals. Accordingly, the test signals may be implemented using one of the available upstream DOCSIS bandwidths, e.g. 200 kHz, 400 kHz, 800 kHz, 1600 kHz, 3200 kHz or 6400 kHz. A preferred implementation may use the narrow 800 kHz bandwidth at the upper band edge where diplexer rolloff is significant since narrow bandwidths minimize the amount of clean spectrum required within the return path and because many modems have problems with the 400 and 200 kHz widths. Wider bandwidths may be used where available spectrum permits in order to gain improved resolution in the measurements.

Figure 5:
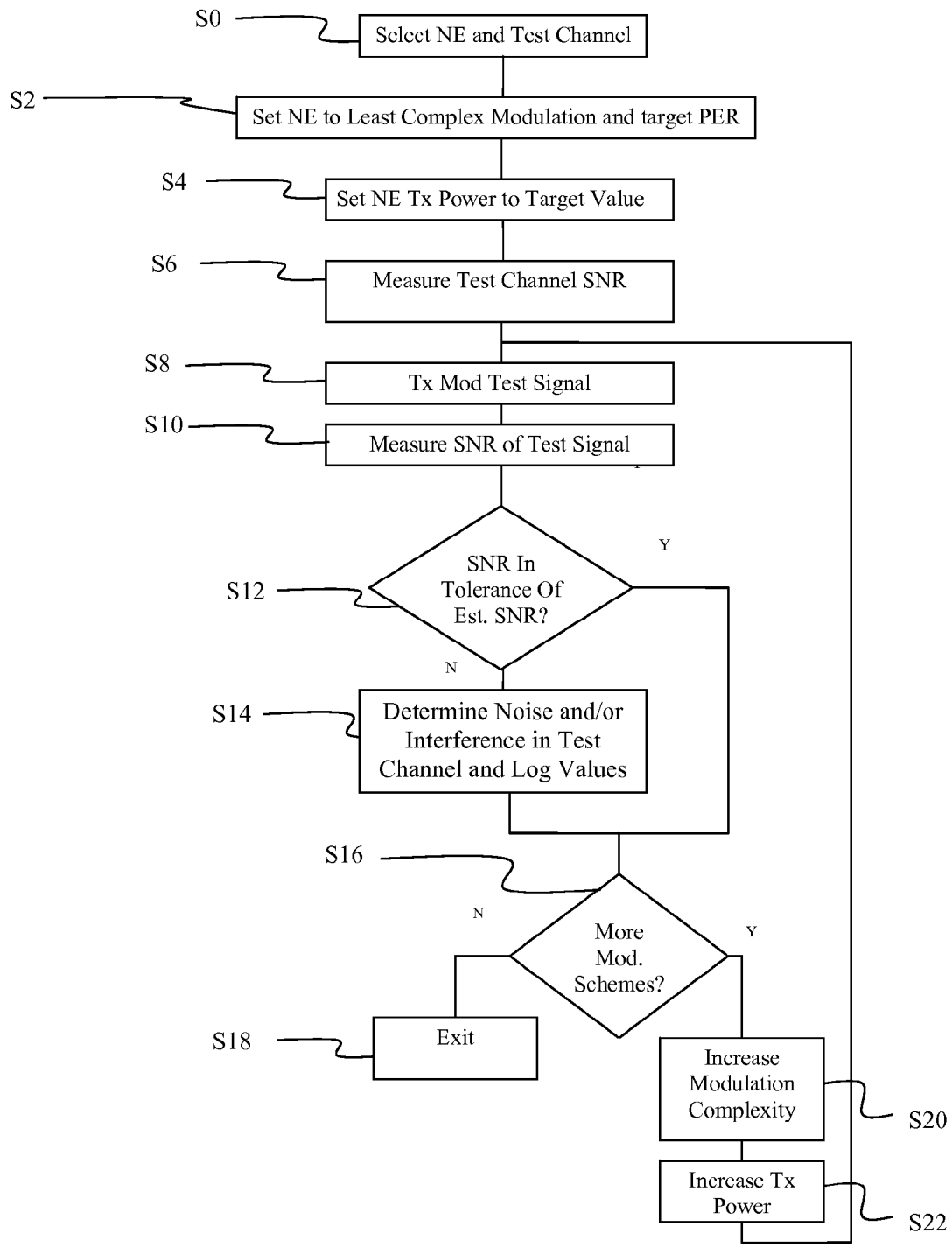
FIG. 5 illustrates an exemplary process in accordance with the principles of the present invention.

An exemplary process for automatically determining the dynamic range of the optical link in the network, e.g. on an optical node is illustrated in FIG. 5. As illustrated in step S0 of FIG. 5, a network element NE is selected to be used in the process and a test channel is also selected. Preferably, the network element is currently idle, has sufficient ability to have their transmit power turned up by (15) dB, and can be controlled remotely by the CMTS to move to new frequencies at command and change its transmission power level. Also preferably, the test channel is an active channel in the network. In a preferred implementation, an additional logical channel at the current active channel frequency is used.

As illustrated in step S2 of FIG. 5, the selected network element NE is set to the least complex modulation scheme, such as 16 QAM. The NE transmission power level is also set to a target value for a target PER in step S4. The SNR levels and the PER in the test channel are measured in step S6 to provide a baseline measurement. The SNR levels may be indicated by a variety of techniques known to those of skill in the art including a measurement of the PER, BER, which may be indicated by the equalizer taps in the equalizer 108 in the headend.

As illustrated in step S8, the network element is instructed to transmit the test signal according to the modulation and power levels indicated in steps S2 and S4. The SNR of the test signal is measured again in step S10. In step S12, it is determined if the SNR for the set PER of the test signal is within a predetermined tolerance of an estimated SNR for the target PER of the test signal. Those of skill in the art will appreciate that the expected values of PER vs. SNR may be obtained from historical practices or theoretically determined using a variety of techniques. If the SNR is not in the range of tolerance of the estimated SNR for the PER and the modulation scheme, step S12, No, then noise and/or interference is determined to be present in the test channels and the values are logged, step S14. In step S14, the difference between the measured and theoretical SNR vs BER (PER) values may be used to quantify the phase noise and/or non-linearity impact. As illustrated, the process determines if more modulation schemes are available for testing in step S16. If the SNR is in the range of tolerance of the estimated SNR for the PER and the modulation scheme, step S12, Yes, then the process determines if more modulation schemes are available for testing in step S16.

If more modulation schemes are available for testing, step S16, Yes, the modulation complexity is increased in step S20. For example, some DOCSIS 2.0 modulation schemes which may be used in order of level of complexity are: 16 QAM, 32

QAM, 64 QAM and 128 QAM. The transmission power level of the selected network element is also adjusted to provide a desired PER for the selected modulation scheme, step S22. The process returns to step S8 in which the test signal is transmitted at new modulation scheme and new power level and the SNR is measured (step S10). Again the measured SNR is evaluated to be within the tolerance of the estimated SNR, step S12 and the process continues to repeat until all of the modulation schemes have been evaluated.

In accordance with the process illustrated in FIG. 5, each available modulation scheme may be tested to determine if excessive interference or phase noise is present on the modulated channel. The maximum modulation complexity that may be achieved in the test channel may be determined through increasing the modulation complexity and the transmit power to achieve a target PER. The phase noise and/or narrow-band interference ($3^{rd}$ order distortion) contribution as a primary upstream impairment is assessed. A database of available of preferred modulation schemes which avoid noise and/or interferences may be derived from the values logged in step S14.

The CMTS spare receiver may be used to make the power measurements to avoid impacting service provided to customers. Alternatively, another receiver could be used to make the measurements by being taken "off line" or by adjusting for the impact caused by normal service.

The processes in FIG. 5 may be implemented in hard wired devices, firmware or software running in a processor. A processing unit for a software or firmware implementation is preferably contained in the CMTS. Any of the processes illustrated in FIG. 5 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory.

The invention enables the technician or engineer to remotely characterize the modulation schemes which are available to a network without significant phase noise or narrowband interference at a central location, such as the headend, such as by using the Motorola BSR64000, rather than using external test equipment, such as the vector signal analyzer and deploying technicians to various locations within the cable plant. The invention also avoids impacting active services. It also allows the cable operator to plan for future offerings and schedule needed maintenance by allowing periodic monitoring of the phase noise and narrowband interference. All measurements may be made through the use of the existing terminal devices (specifically, DOCSIS terminal devices such as MTAs and cable modems) as well as headend equipment (specifically a DOCSIS CMTS).

Accurate knowledge of the available or optimum modulation schemes of a network will enable an operator to utilize the available resources of their network more efficiently, such as by adding additional network elements to improve portions of the network with the least complex modulation schemes so that those portions may be able to use more complex modulation schemes. An operator may also use the invention to identify and repair a network component introducing phase noise or narrowband interference to improve signal quality and network speed.

What is claimed is:

1. An apparatus for characterizing modulation schemes for a network comprising:
    a controller configured to instruct a network element to transmit a test signal at a test frequency, a first modulation scheme and a first power level;
    a receiver configured to receive the test signal from the network element; and
    a multiple tap equalizer which measures a signal to noise ratio of the test signal based on measurement of at least one of a packet error rate, a modulation error ratio, or a bit error rate of the test signal,
    wherein the controller determines if the signal to noise ratio is within a predetermined range of an estimated signal to noise ratio, and the controller determines that the modulation scheme has excessive inband interference or phase noise when the signal to noise ratio is not within a predetermined range of an estimated signal to noise ratio,
    wherein the controller is further configured to instruct the network element to transmit a second test signal at a second modulation scheme different from the first modulation scheme, and to determine if a second signal to noise ratio associated with the second test signal is within a predetermined range of a second estimated signal to noise ratio, and the controller determines that the second modulation scheme has excessive inband interference or phase noise when the second signal to noise ratio is not within a predetermined range of the second estimated signal to noise ratio,
    wherein the controller is further configured to determine which modulation schemes provide a signal to noise ratio is within a predetermined range of an estimated signal to noise ratio.

2. The apparatus of claim 1, wherein the controller is further configured to instruct the network element to repeatedly transmit the test signal at other modulation schemes available.

3. The apparatus of claim 2, wherein the controller is further configured to instruct the network element to adjust the transmission power of the test signal to correspond with a predetermined packet error rate for each of the other modulation schemes.

4. The apparatus of claim 3, wherein the controller creates a list of optimum modulation schemes for the network to use.

5. The apparatus of claim 1, wherein the receiver is a receiver which is not assigned to handle communications between network elements, whereby a plurality of modulation schemes are characterized without interrupting communications between network elements and a cable modem termination system.

6. A method for characterizing modulation schemes for a network comprising the steps of:
    selecting a network element to transmit a test signal at a test frequency, a first modulation scheme and a first power;
    receiving the test signal from the network element;
    measuring a signal to noise ratio of the test signal based on measurement of at least one of a packet error rate, a modulation error ratio, or a bit error rate of the test signal;
    determining if the signal to noise ratio is within a predetermined range of an estimated signal to noise ratio, and
    determining that the modulation scheme has excessive inband interference or phase noise when the signal to noise ratio is not within a predetermined range of an estimated signal to noise ratio,
    instructing the network element to transmit a second test signal at a second modulation scheme different from the first modulation scheme,
    determining if a second signal to noise ratio associated with the second test signal is within a predetermined range of a second estimated signal to noise ratio, determining that the second modulation scheme has excessive inband interference or phase noise when the second signal to noise ratio is not within a predetermined range of the second estimated signal to noise ratio, and determining which modulation schemes provide a signal to noise ratio is within a predetermined range of an estimated signal to noise ratio.

7. The method of claim 6, further comprising the steps of:
instructing the network element to change the modulation scheme and transmit the test signal at other modulation schemes available.

8. The method of claim 7, further comprising the step of instructing the network element to adjust the transmission power of the test signal to correspond with a predetermined packet error rate for each of the modulation schemes.

9. The method of claim 8, further comprising the step of creating a list of optimum modulation schemes for the network to use.

10. The method of claim 6, wherein the step of receiving the test signal includes receiving the test signal at a receiver which is not assigned to handle communications between network elements, whereby a plurality of modulation schemes are characterized without interrupting communications between network elements and a cable modem termination system.

11. A computer readable medium carrying instructions for a computer to perform a method for characterizing modulation schemes for a network comprising the steps of:
selecting a network element to transmit a test signal at a test frequency at a first modulation scheme and a first power;
receiving the test signal from the network element;
measuring a signal to noise ratio of the test signal based on measurement of at least one of a packet error rate, a modulation error ratio, or a bit error rate of the test signal;
determining if the signal to noise ratio is within a predetermined range of an estimated signal to noise ratio, and
determining that the modulation scheme has excessive inband interference or phase noise when the signal to noise ratio is not within a predetermined range of an estimated signal to noise ratio,
instructing the network element to transmit a second test signal at a second modulation scheme different from the first modulation scheme,
determining if a second signal to noise ratio associated with the second test signal is within a predetermined range of a second estimated signal to noise ratio,
determining that the second modulation scheme has excessive inband interference or phase noise when the second signal to noise ratio is not within a predetermined range of the second estimated signal to noise ratio, and
determining which modulation schemes provide a signal to noise ratio is within a predetermined range of an estimated signal to noise ratio.

12. The computer readable medium of claim 11, wherein the method further comprise performing the steps of:
instructing the network element to change the modulation scheme and transmit the test signal at other modulation schemes available.

13. The computer readable medium of claim 12, wherein the method further comprise performing the steps of instructing the network element to adjust the transmission power of the test signal to correspond with a predetermined packet error rate for each of the modulation schemes.

14. The computer readable medium of claim 13, wherein the method further comprises the step of creating a list of optimum modulation schemes for the network to use.

15. The computer readable medium of claim 11, wherein the step of receiving the test signal includes receiving the test signal at a receiver which is not assigned to handle communications between network elements, whereby a plurality of modulation schemes are characterized without interrupting communications between network elements and a cable modem termination system.

16. A network comprising:
a controller configured to instruct a network element to transmit a test signal at a test frequency at a first modulation scheme and a first power;
a receiver configured to receive the test signal from the network element; and
an equalizer which measures a signal to noise ratio of the test signal based on measurement of at least one of a packet error rate, a modulation error ratio, or a bit error rate of the test signal,
wherein the controller determines if the signal to noise ratio is within a predetermined range of an estimated signal to noise ratio, and the controller determines that the modulation scheme has excessive inband interference or phase noise when the signal to noise ratio is not within a predetermined range of an estimated signal to noise ratio,
wherein the controller is further configured to instruct the network element to transmit a second test signal at a second modulation scheme different from the first modulation scheme, and to determine if a second signal to noise ratio associated with the second test signal is within a predetermined range of a second estimated signal to noise ratio, and the controller determines that the second modulation scheme has excessive inband interference or phase noise when the second signal to noise ratio is not within a predetermined range of the second estimated signal to noise ratio
wherein the controller is further configured to determine which modulation schemes provide a signal to noise ratio is within a predetermined range of an estimated signal to noise ratio.

17. The network of claim 16, wherein the controller is further configured to instruct the network element to repeatedly transmit the test signal at other modulation schemes available, and to determine which modulation schemes provide a signal to noise ratio is within a predetermined range of an estimated signal to noise ratio.

18. The network of claim 17, wherein the controller is further configured to instruct the network element to adjust the transmission power of the test signal to correspond with a predetermined packet error rate for each of the other modulation schemes.

19. The network of claim 18, wherein the controller creates a list of optimum modulation schemes for the network to use.

20. The network of claim 16, wherein the receiver is a receiver which is not assigned to handle communications between network elements, whereby a plurality of modulation schemes are characterized without interrupting communications between network elements and a cable modem termination system.

* * * * *